(12) United States Patent
Theunissen et al.

(10) Patent No.: US 7,586,279 B2
(45) Date of Patent: Sep. 8, 2009

(54) ACTUATOR POSITION SWITCH

(75) Inventors: William S. Theunissen, Rogers, MN (US); Cory L. Grabinger, Maple Grove, MN (US); Scott D. McMillan, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 343 days.

(21) Appl. No.: 11/558,187

(22) Filed: Nov. 9, 2006

(65) Prior Publication Data

US 2008/0111512 A1    May 15, 2008

(51) Int. Cl.
G05D 3/00    (2006.01)
G05B 1/06    (2006.01)

(52) U.S. Cl. .................. 318/466; 318/444; 318/663

(58) Field of Classification Search .......... 318/466, 318/444, 663, 560, 266; 700/29; 360/75
See application file for complete search history.

(56) References Cited

U.S. PATENT DOCUMENTS

| | | | |
|---|---|---|---|
| 3,386,049 A * | 5/1968 | Rorden | 331/2 |
| 3,402,362 A * | 9/1968 | Rorden | 331/2 |
| 3,937,974 A | 2/1976 | Lafuze | |
| 3,959,702 A | 5/1976 | Godwin et al. | |
| 4,027,216 A | 5/1977 | Rozek | |
| 4,038,589 A | 7/1977 | Heyne et al. | |
| 4,084,743 A | 4/1978 | Matthews et al. | |
| 4,139,807 A | 2/1979 | Hucker | |
| 4,295,085 A | 10/1981 | Lafuze | |
| 4,311,950 A | 1/1982 | Goldin et al. | |
| 4,315,202 A | 2/1982 | Dawson et al. | |
| 4,364,004 A | 12/1982 | Bourbeau | |
| 4,393,597 A | 7/1983 | Picard et al. | |
| 4,422,028 A | 12/1983 | Godwin et al. | |
| 4,501,155 A | 2/1985 | Garritano | |
| 4,546,293 A | 10/1985 | Peterson et al. | |
| 4,591,774 A | 5/1986 | Ferris et al. | |
| 4,591,775 A | 5/1986 | Niissel et al. | |
| 4,608,527 A | 8/1986 | Glennon et al. | |
| 4,618,808 A | 10/1986 | Ish-Shalom et al. | |
| 4,651,068 A | 3/1987 | Meshkat-Razavi | |
| 4,656,410 A | 4/1987 | Shibata | |
| 4,659,973 A | 4/1987 | Stich | |
| 4,701,839 A | 10/1987 | McNally et al. | |
| 4,704,569 A | 11/1987 | Mallick, Jr. et al. | |
| 4,751,438 A | 6/1988 | Markunas | |
| 4,794,314 A | 12/1988 | Janu et al. | |
| 4,818,908 A | 4/1989 | Tamae et al. | |
| 4,825,138 A | 4/1989 | Platzer et al. | |

(Continued)

OTHER PUBLICATIONS

"Current Loop Control of a Brushless DC Motor with Hall Sensors Using the ADMC401," Analog Devices Inc., 19 pages, Oct. 2001.

(Continued)

Primary Examiner—Paul Ip

(57) ABSTRACT

Methods and systems are disclosed for controlling the operation of a component according to the position of an actuated part of an actuator. In one illustrative embodiment, a position sensor is used to sense the current position of the actuated part. The position sensor may provide a position signal to a controller, wherein the controller may use the position signal to control the on/off position of one or more electrical switches that can control the operation of the component.

25 Claims, 10 Drawing Sheets

U.S. PATENT DOCUMENTS

| | | |
|---|---|---|
| 4,835,448 A | 5/1989 | Dishner et al. |
| 4,839,579 A | 6/1989 | Ito et al. |
| 4,841,202 A | 6/1989 | Dishner et al. |
| 4,888,533 A | 12/1989 | Gotoh et al. |
| 4,897,583 A | 1/1990 | Rees |
| 4,937,508 A | 6/1990 | Rozman |
| 4,939,441 A | 7/1990 | Dhyanchand |
| 4,949,021 A | 8/1990 | Rozman et al. |
| 5,029,263 A | 7/1991 | Rozman |
| 5,038,062 A | 8/1991 | Shiraki |
| 5,047,681 A | 9/1991 | Gaillard et al. |
| 5,053,688 A | 10/1991 | Rees |
| 5,053,689 A | 10/1991 | Woodson et al. |
| 5,081,405 A | 1/1992 | Nelson |
| 5,097,189 A | 3/1992 | Ito et al. |
| 5,113,125 A | 5/1992 | Stacey |
| 5,168,202 A | 12/1992 | Bradshaw et al. |
| 5,200,661 A | 4/1993 | Shramo et al. |
| 5,202,610 A | 4/1993 | Frye et al. |
| 5,274,315 A | 12/1993 | Finocchi |
| 5,384,527 A | 1/1995 | Rozman et al. |
| 5,406,186 A | 4/1995 | Fair |
| 5,416,397 A | 5/1995 | Mazzara et al. |
| 5,416,652 A | 5/1995 | Lewis |
| 5,420,492 A | 5/1995 | Sood et al. |
| 5,425,165 A | 6/1995 | Shramo et al. |
| 5,428,470 A | 6/1995 | Labriola, II |
| 5,430,362 A | 7/1995 | Carr et al. |
| 5,449,986 A | 9/1995 | Dozor |
| 5,450,999 A | 9/1995 | Scholten et al. |
| 5,461,293 A | 10/1995 | Rozman et al. |
| 5,488,286 A | 1/1996 | Rozman et al. |
| 5,493,200 A | 2/1996 | Rozman et al. |
| 5,495,162 A | 2/1996 | Rozman et al. |
| 5,495,163 A | 2/1996 | Rozman et al. |
| 5,519,546 A | 5/1996 | Lewis |
| 5,565,750 A | 10/1996 | Padgett |
| 5,567,874 A | 10/1996 | Suzuki et al. |
| 5,587,641 A | 12/1996 | Rozman |
| 5,594,322 A | 1/1997 | Rozman et al. |
| 5,619,085 A | 4/1997 | Shramo |
| 5,656,911 A | 8/1997 | Nakayama et al. |
| 5,677,605 A | 10/1997 | Cambier et al. |
| 5,710,755 A | 1/1998 | Chen |
| 5,717,562 A * | 2/1998 | Antone et al. ................ 361/155 |
| 5,740,880 A | 4/1998 | Miller |
| 5,744,876 A | 4/1998 | Fangio |
| 5,760,707 A | 6/1998 | Katagiri |
| 5,767,643 A | 6/1998 | Pham et al. |
| 5,777,477 A | 7/1998 | Okano |
| 5,793,180 A | 8/1998 | Maiocchi et al. |
| 5,796,194 A | 8/1998 | Archer et al. |
| 5,798,596 A | 8/1998 | Lordo |
| 5,850,130 A | 12/1998 | Fujisaki et al. |
| 5,859,518 A | 1/1999 | Vitunic |
| 5,874,796 A | 2/1999 | Petersen |
| 5,912,542 A | 6/1999 | Zalesski |
| 5,912,543 A | 6/1999 | Mahr et al. |
| 5,923,728 A | 7/1999 | Ikkai et al. |
| 5,964,455 A | 10/1999 | Catanzarite et al. |
| 5,986,419 A | 11/1999 | Archer et al. |
| 5,990,643 A | 11/1999 | Holling et al. |
| 5,995,710 A | 11/1999 | Holling et al. |
| 6,002,234 A | 12/1999 | Ohm et al. |
| 6,003,325 A * | 12/1999 | Kurahashi et al. ............. 62/212 |
| 6,049,194 A | 4/2000 | Nakagawa et al. |
| 6,075,332 A | 6/2000 | McCann |
| 6,078,158 A | 6/2000 | Heeren et al. |
| 6,114,827 A | 9/2000 | Alvaro |
| 6,181,091 B1 | 1/2001 | Heeren et al. |
| 6,222,333 B1 | 4/2001 | Garnett et al. |
| 6,236,179 B1 | 5/2001 | Lawler et al. |
| 6,246,232 B1 | 6/2001 | Okumura |
| 6,271,641 B1 | 8/2001 | Yasohara et al. |
| 6,307,336 B1 | 10/2001 | Goff et al. |
| 6,310,450 B1 | 10/2001 | Arrigo |
| 6,313,601 B1 | 11/2001 | Kubo et al. |
| 6,324,085 B2 | 11/2001 | Kimura et al. |
| 6,367,337 B1 | 4/2002 | Schlabach |
| 6,373,211 B1 | 4/2002 | Henry et al. |
| 6,404,581 B1 * | 6/2002 | Shah ........................... 360/75 |
| 6,407,524 B1 | 6/2002 | Endo et al. |
| 6,506,011 B1 | 1/2003 | Sishtla |
| 6,508,072 B1 | 1/2003 | Kanazawa et al. |
| 6,524,209 B2 | 2/2003 | Ito et al. |
| 6,549,871 B1 | 4/2003 | Mir et al. |
| 6,577,097 B2 | 6/2003 | Krefta et al. |
| 6,580,235 B2 | 6/2003 | Laurent |
| 6,605,912 B1 | 8/2003 | Bharadwaj et al. |
| 6,626,002 B1 | 9/2003 | Notohara et al. |
| 6,631,781 B2 | 10/2003 | Williams et al. |
| 6,646,851 B1 * | 11/2003 | Gudat ........................ 361/160 |
| 6,647,329 B2 | 11/2003 | Kleinau et al. |
| 6,651,952 B1 | 11/2003 | Hightower et al. |
| 6,683,427 B2 | 1/2004 | Desbiolles et al. |
| 6,686,713 B2 | 2/2004 | Desbiolles et al. |
| 6,694,287 B2 | 2/2004 | Mir et al. |
| 6,732,438 B2 | 5/2004 | Enzinna |
| 6,741,048 B2 | 5/2004 | Desbiolles et al. |
| 6,745,087 B2 * | 6/2004 | Shah ........................... 700/29 |
| 6,801,011 B2 | 10/2004 | Ide |
| 6,812,667 B2 | 11/2004 | Yasohara et al. |
| 6,826,499 B2 | 11/2004 | Colosky et al. |
| 6,828,752 B2 | 12/2004 | Nakatsugawa et al. |
| 6,828,919 B1 | 12/2004 | Gold |
| 6,900,607 B2 | 5/2005 | Kleinau et al. |
| 6,900,613 B2 | 5/2005 | Hirono |
| 6,911,794 B2 | 6/2005 | Maslov et al. |
| 6,912,427 B1 | 6/2005 | Pattee et al. |
| 6,914,399 B2 | 7/2005 | Kushion et al. |
| 7,265,512 B2 * | 9/2007 | McMillan et al. ........... 318/663 |
| 7,323,842 B2 * | 1/2008 | Muldowney-Colston et al. . 318/444 |
| 2005/0127861 A1 | 6/2005 | McMillan et al. |
| 2005/0194554 A1 | 9/2005 | Seberger |

OTHER PUBLICATIONS

"SimpleServo Technical Section," 19 pages, prior to filing date of present application.

http://en.wikipedia.org/wiki/Brushless_Motor, "Brushless DC Electric Motor," Wikipedia, the Free Encyclopedia, 2 pages, printed Aug. 4, 2005.

http://www.drbrushless.com/articles/advuni/, "Advanced Unipolar PWM Technique," 2 pages, printed Aug. 12, 2005.

http://www.drbrushless.com/articles/dcbctheory/, "DC Brushless Commutation Theory Basics," 1 page, printed Aug. 12, 2005.

http://www.drbrushless.com/articles/smartini/, "Smart Position Initialization Procedure for Sinusoidal Brushless Motor with Incremental Encoder with Hall Sensors in the Presence of Load Torque," 3 pages, printed Aug. 12, 2005.

* cited by examiner

7,586,279 B2

ACTUATOR POSITION SWITCH

FIELD

The present invention relates generally to position switches, and more particularly, to position switches for use with actuators.

BACKGROUND

Position switches are widely used today to detect and report the position of various mechanical components or devices. For example, many actuators use position switches to detect and report when an actuated part reaches an end or some other discrete position along a defined range of motion. In some cases, a controller receives a signal from a position switch, and uses that signal to cut power to the actuator when the end or other position is reached.

In some cases, one or more position switches may be used to help control other components within a system. For example, FIG. 1 is a schematic diagram of an example system that uses two position switches to help control other components within the system. FIG. 1 includes an actuator 10, a controller 12, a motor 14, a gear train 16, two mechanical position switches 18a and 18b, and an actuated part 20. The controller 12 controls the operation of the motor 14, and the motor 14 moves the position of the actuated part 20 via the gear train 16.

Each of the mechanical position switches 18a and 18b detect and report when the actuated part 20 reaches some discrete position along a defined range of motion. Each of the mechanical position switches 18a and 18b is shown having a lever 22a and 22b, respectively, that slide along a drive shaft 26 that extends between the gear train 16 and the actuated part 20. The drive shaft 26 shown in FIG. 1 has two cams 24a and 24b. The cams 24a and 24b are shown fixed relative to the drive shaft 26, and thus turn with the drive shaft 26. The cams 24a and 24b project laterally away from the shaft 26 at discrete locations such that when the drive shaft 26 is rotated, the cams 24a and 24b push the corresponding lever 22a and 22b away from the shaft 26 at corresponding discrete shaft positions. For example, and in FIG. 1, cam 24a is shown pushing lever 22a away from the drive shaft 26, thereby causing the mechanical position switch 18a to close, while cam 22b is shown as not pushing lever 22b away from the drive shaft 26, thereby allowing the mechanical position switch 18b to remain open. The drive shaft position shown in FIG. 1 may correspond to one defined end position of the actuated part 20. When the motor 14 rotates the drive shaft 26 to another end position, the cam 22b may push lever 22b away from the drive shaft 26, thereby causing the mechanical position switch 18b to close, while cam 22a may then not push lever 22a away from the drive shaft 26, thereby causing the mechanical position switch 18a to be open. As can be seen, the cams 24a and 24b, levers 22a and 22b and mechanical switches 18a and 18b may be used to detect when the actuated part 20 reaches two discrete positions along a defined range of motion. In some cases, more or less cams, levers and mechanical switches may be provided to detect other defined discrete positions of the actuated part 20.

The mechanical position switches 18a and 18b may be electrically coupled to one or more control signals 28a and 28b that can be used to help control (e.g. enable or disable) one or more other components (not shown) of a system. In some cases, the control signals 28a and 28b may be higher voltage signals, and care must be taken to use appropriately rated mechanical position switches 18a and 18b. Also, care must be taken to adhere to appropriate regulatory standards (such as the UL standard) dealing with higher voltage lines.

Many actuators with such mechanical position switches, levers and cams do not lend themselves very well to automated assembly. Moreover, reconfiguring such actuators in the field can be time consuming and tedious. For example, to change the switch settings of such an actuator, the cams 24a and 24b and/or the one or more levers 22a and 22b may have to be manually moved and positioned to properly set the desired switch points along the range of motion of the actuated part 20. In addition, and in some cases, the operating cams 22 and levers 24 can be susceptible to mechanical wear, which can result in decreased accuracy, and in some cases, reduced reliability and even failure. Furthermore, when the control signals 28a and 28b are higher voltage signals, the design of the actuator can become complicated because running and routing high voltage wires and/or traces in such a way to satisfy UL or other standards can be challenging.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to position switches, and more particularly, to position switches for use with actuators. In one illustrative embodiment, a position sensor is used to sense the position of the actuated part, sometimes via the position of a motor, a gear train, a drive shaft, the actuated part itself, and/or any other suitable part. The position sensor may include, for example, a potentiometer, an optical sensor, a magnetic sensor, a mechanical switch and/or any other suitable position sensor as desired. In some cases, the position sensor may provide an analog signal that reports the current position of the actuated part along a range of motion of the actuated part, rather than just a discrete signal that indicates a specific position has been reached. The position sensor may provide a position signal to a controller, and the controller may use the position signal to control the on/off position of one or more electrical switches.

In an illustrative embodiment, the one or more electrical switches may include any suitable component or circuit that is capable of performing an electrical switch function. In some cases, at least one of the electrical switches may include a relay, a triac, a transistor, or combinations thereof. However, it is contemplated that any suitable components may be used. The electrical switches can be wired to one or more other components within a system, and can be used to help control (e.g. enable or disable) one or more of the other components, if desired.

The controller may be programmed or otherwise configured to more easily allow the switch points of the one or more electrical switches to be set and/or changed. In some cases, the switch points of the one or more electrical switches may be set or changed by software and/or data read by software. Moreover, and in some cases, hysteresis, various delay and/or other switching parameters may be set and/or changed in one or both directions of travel of the actuated part. This may add significant flexibility to the overall systems when so provided.

In some cases, it is contemplated that the desired switch points for the one or more electrical switches may be fairly easily set and/or changed. In one illustrative example, the factory or an installer in the field may simply move the actuated part to a desired position, and then have a corresponding position value provided by the position sensor stored to a memory. The stored position value may then be used by the controller as a switch point for one or more of the electrical switches. Alternatively, or in addition, one or more user adjustable potentiometers (e.g. pots) may be provided for adjusting a value that is provided to the controller that can be used as the switch points of the one or more electrical switches. These are just a few illustrative approaches that may be used to set and/or change the switch points of the one or more electrical switches.

BRIEF DESCRIPTION

The invention may be more completely understood in consideration of the following detailed description of various illustrative embodiments of the invention in connection with the accompanying drawings, in which.

DETAILED DESCRIPTION

Figure 1:
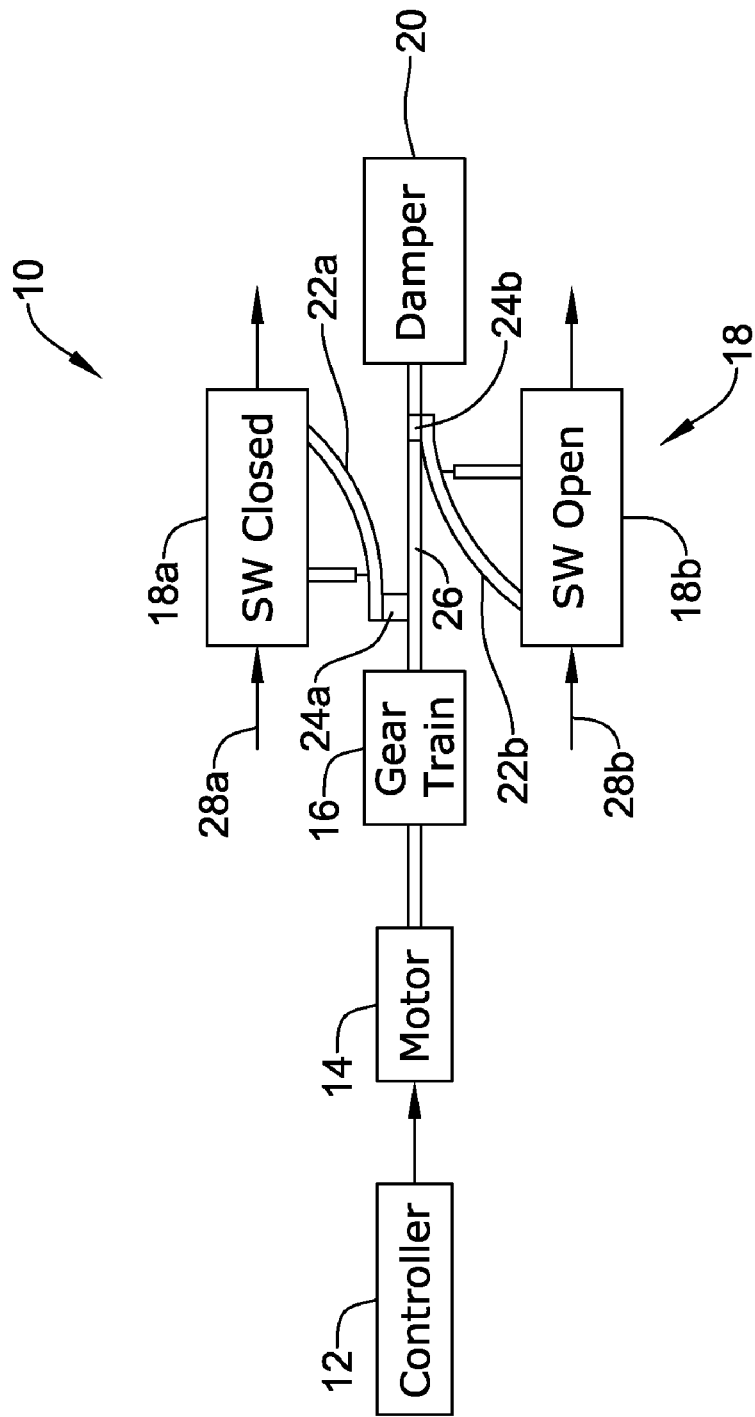
FIG. 1 is a block diagram of a typical actuator having a mechanical switch to monitor the position of the damper.

The following description should be read with reference to the drawings wherein like reference numerals indicate like elements throughout the several views. The detailed description and drawings show several embodiments which are meant to be illustrative of the claimed invention.

Figure 2:
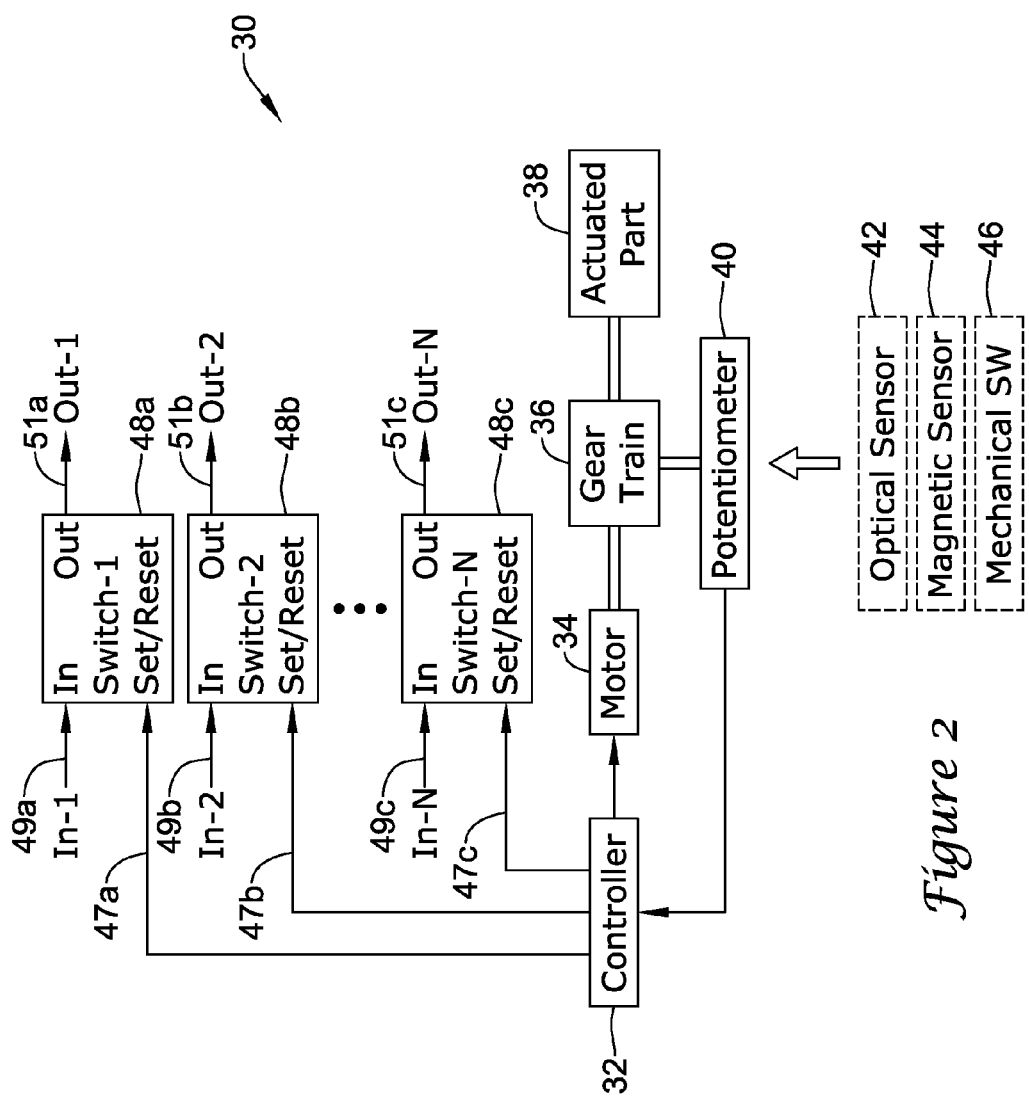
FIG. 2 is a block diagram of an actuator assembly having multiple switches in according with one illustrative embodiment of the present invention.

The present invention generally relates to position switches, and more particularly, to position switches for use with actuators. FIG. 2 is a block diagram of an actuator 30 having multiple electric switches 48a-48c in according with an illustrative embodiment of the present invention. In some cases, the actuator 30 may be an HVAC actuator for actuating a valve, a damper or any other device or component, but this is not required. Rather, it is contemplated that the actuator 30 may be any suitable actuator for use in any suitable application.

The illustrative actuator 30 may include an actuated part 38, a motor 34, a driving mechanism 36, a controller 32, and a position sensor 40. When the actuator 30 is an HVAC actuator, the actuated part 38 may be a valve or a damper, such as, for example, an air flow damper, a water valve, or a gas valve. However, as noted above, it is contemplated that the actuator 30 is not limited to HVAC applications, and that any suitable actuatable part may be used, as desired.

In the illustrative embodiment, the motor 34 can be selectively activated by the controller 32 to move the position of the actuated part 38 to a desired actuated position. In some cases, the motor 34 may be an electric motor 34, but this is not required. The illustrative electric motor 34 includes a drive signal input coupled to the controller 32, and a drive shaft output for moving the actuated part 38. In the illustrative embodiment, the drive shaft output is coupled to a gear train 36 to help move the actuated part 38, but this is not required. Rather, it is contemplated that the drive shaft of the motor 34 may directly drive the actuated part 38 via a drive shaft (see FIG. 3), or may include any suitable driving mechanism (belts, gears, etc.) between the drive shaft of the motor 34 and the actuated part 38, as desired.

In the illustrative embodiment, the electric motor 34 receives the drive signal from the controller 32, and in response to the drive signal, rotates the drive shaft output and the gear train 36, which in turn, moves the position of the actuated part 38.

When so provided, the gear train 36 may include a set or system of gears configured to transfer rotational torque of the motor 34 to the actuated part 38. In some cases, the position of at least a portion of the gear train 36, such as, at least part of the set or system of gears, may correlate to the position of the actuated part 38. For example, the gear train 36 may have a first position that correlates to an open position of the actuated part 38 and a second position that correlates to a closed position of the actuated part 38. More generally, the current position of the gear train 36 may be correlated to the current position of the actuated part 38.

In some cases, the controller 32 may be configured to receive communications from a system controller, such as an HVAC system controller, such as, to receive a call to move the position of the actuated part 38 to a desired position. In response, the controller 32 may send an appropriate drive signal to the motor 34. Additionally, and in the illustrative embodiment, the controller 32 may be coupled to the position sensor 40, and may be configured to receive a position signal from the position sensor 40 that can be correlated to the current position of the actuated part 38.

In some cases, the controller 32 may be coupled to at least one electrical switch 48a-48c, and may be programmed or otherwise configured to provide at least one switch output signal 47a-47c to the at least one switch 48a-48c. The state of the output signals 47a-47c may depend on the current detected position of the actuated part 38. The at least one switch output signal 47a-47c may control the switching of the at least one of the switches 48a-48c.

In some cases, the electric motor 34 may include the controller 32. For example, many DC brushless motors include a controller (e.g. microprocessor or microcontroller) for controlling the commutation of the motor 34 during operation of the motor 34. When so provided, the controller 32 may be implemented using the controller of the DC brushless motor. However, this is not required, and it is contemplated that the controller 32 may be separately provided from the motor 34, if desired. In addition, while the controller 32 is shown as providing the switch output signals 47a-47c, it is contemplated that a separate controller may be used to provide the switch output signals 47a-47c, if desired.

In the illustrative embodiment, the position sensor 40 may be configured to monitor and/or detect the current position of the actuated part 38. In the illustrative embodiment, the position sensor 40 may detect the current position of one or more components of the gear train 36, which can be correlated to the current position of the actuated part 38. However, it is contemplated that the position sensor 40 may be configured to detect the position of any suitable part or component of the drive train including the position of the motor, the gear train, a drive shaft, the actuated part itself, or any other suitable device or component that can be correlated to a current position of the actuated part 38.

In some cases, the position sensor 40 may be a potentiometer 40. The potentiometer 40 may be a variable resistor potentiometer that varies in resistance with the position of the actuated part 38. Alternatively, or in addition, it is contemplated that the position sensor 40 may be an optical sensor, a magnetic sensor, a mechanical switch, or any other suitable position sensor, as illustrated by dashed blocks 42, 44 and 46 in FIG. 2.

The at least one electrical switch 48a-48c may be coupled to, and act as a switch for, one or more other system components. In the illustrative embodiment, each of the electrical switches 48a-48c includes an input 49a-49c and one or more outputs 51a-51c, respectively. In one illustrative embodiment, each of the inputs 49a-49c may be coupled to an enable (or some other) signal that is adapted to enable (or otherwise control) a corresponding system component such as a fan, a damper, or any other suitable system component, as desired. The outputs 51a-51c of the electrical switches 48a-48c may be coupled to the enable (or other) input of the corresponding system components.

In some cases, the electrical switches 48a-48c may function as an inter-lock, which may help prevent the activation of a system component unless the actuated part 38 is in a desired position. For example, the actuated part 38 may be a flue damper for an HVAC furnace, and the electrical switch 48a may selectively pass an enable signal to a gas burner of the HVAC furnace. It may be desirable to not allow the enable signal to pass to the gas burner unless the flue damper 38 is in the open position. That is, in this example, the controller may not close switch 48a unless the flue damper 38 is in the open position, providing an inter-lock function.

In the illustrative embodiment, N switches 48a-48c are provided, wherein N is an integer greater than zero. In some cases, the N switches 48a-48c may be able to control N system components with each system component corresponding to a single switch 48a-48c. However, it is contemplated that each system component may correspond to more than a single switch 48a-48c, such as a plurality of switches. Additionally, it is contemplated that there may only be a single switch 48a-48c, or any number of switches 48a-48c, used to control the other system components, as desired. Each switch 48a-48c may be coupled to the at least one switch output signal 47a-47c provided by the controller 32. In some cases, each switch output signal 47a-47c of the controller 32 may be coupled to a single switch 48a-c, or, in other cases, to multiple switches 48a-c, or any combination thereof, as desired.

In the illustrative embodiment shown in FIG. 2, each switch 48a-48c includes a SET/RESET terminal, an IN terminal, and an OUT terminal. The SET/RESET terminal may be coupled to a switch output signal 47a-47c of the controller 32, and may control the position of the switch 48a-48c between an open position and a closed position. For example, if the switch 48a is to be closed, the switch 48a may be SET, and if the switch 48a is to be opened, the switch 48a may be RESET. In some cases, the electrical switches 48a-48c may also include a switching circuit to help move the switch 48a-48c between the open position and closed position (or in some cases, an intermediate position—e.g. three position switches).

It is contemplated that the IN and OUT terminals may be connected in to the one or more other system component that the switches 48a-48c are to help control. In some cases, the switches 48a-48c may be connected in series with, for example, an enable, power, or other signal for controlling the operating of the other system components. In the case when the corresponding switch 48a-48c is closed, the IN terminal of the switch 48a-48c may be electrically connected to the OUT terminal to pass the incoming signal from the IN terminal to the OUT terminal when the switch is closed. In the case when the switch 48a-48c is in the open position, the IN terminal may be disconnected from the OUT terminal, which prevents the incoming signal from passing to the OUT terminal.

In some illustrative embodiments, each of the electrical switches 48a-48c may include at least one relay to switch the switch 48a-48c on and off, but this is not required. In some cases, the relays may be latching relays, electromagnetic relays, non-latching relays, or any other suitable relay as desired. Alternatively, or in additionally, it is contemplated that the switches 48a-48c may include other switching devices such as one or more transistors, triacs, or any other suitable switching component or device to help control the switching operation, as desired.

Figure 3:
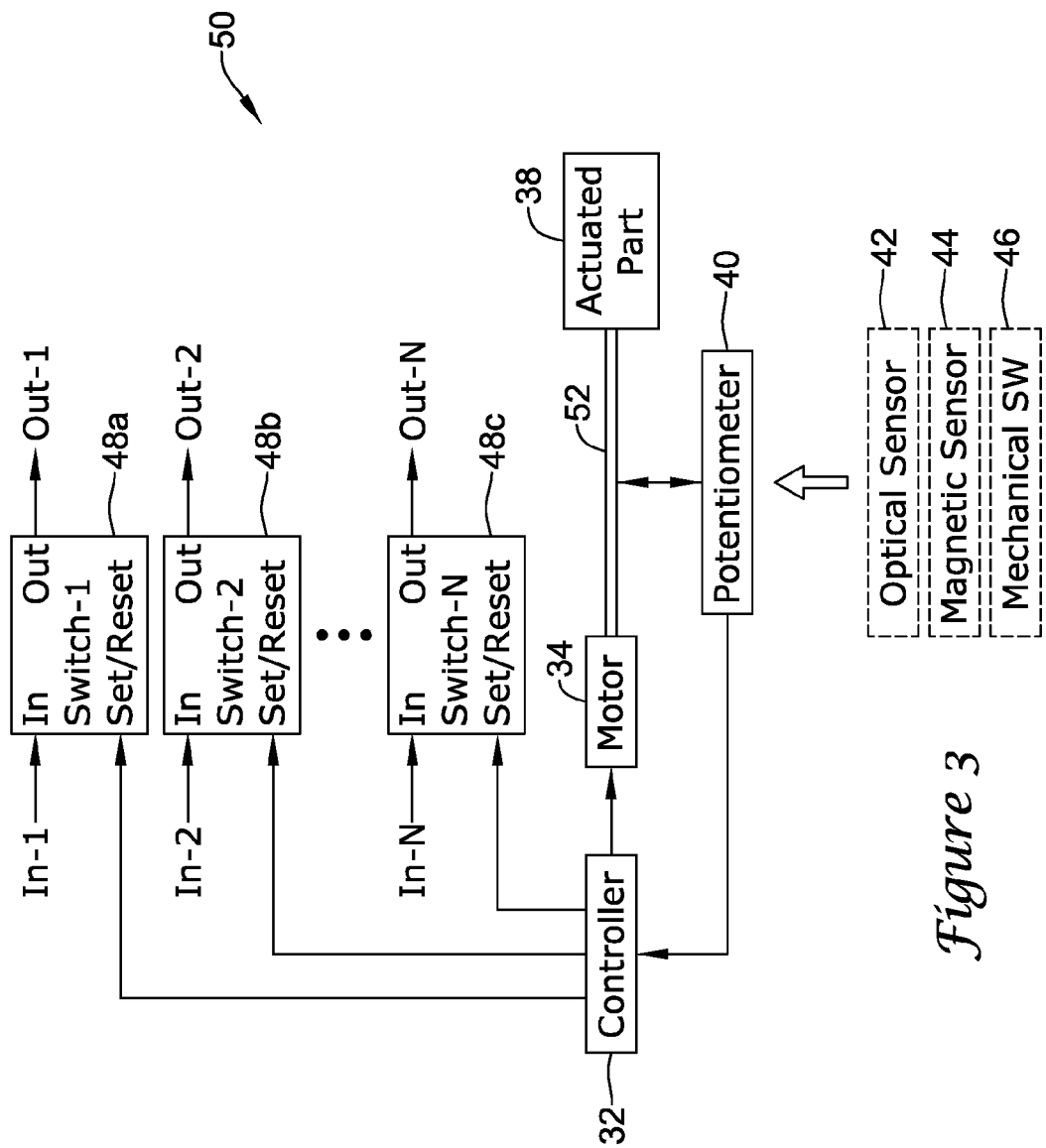
FIG. 3 is a block diagram of another actuator assembly having multiple switches in accordance with another illustrative embodiment of the present invention.

FIG. 3 is a block diagram of an actuator 50 having one or more electric switches 48a-48c in according with another illustrative embodiment of the present invention. The illustrative embodiment shown in FIG. 3 is similar to that shown and described with reference to FIG. 2 except that the gear train 36 of FIG. 2 is not provided, and the motor 34 directly drives the actuated part 38 using a drive shaft 52.

In the illustrative embodiment, the drive shaft 52 may transfer rotational torque from the motor 34 directly to the actuated part 38. In this case, the position of the drive shaft 52 may correlate to the position of the actuated part 38. For example, the drive shaft may have a first position that correlates to an open position of the actuated part 38 and a second position that correlates to a closed position of the actuated part 38. More generally, the position of the drive shaft 52 may be correlated to a corresponding position of the actuated part 38. Otherwise, the actuator 50 may operate similar to that shown and described with reference to FIG. 2.

Like FIG. 2 above, it is contemplated that the position sensor 40 may be a potentiometer 40. The potentiometer 40 may be a variable resistor potentiometer that varies in resistance with the position of the actuated part 38. Alternatively, or in addition, it is contemplated that the position sensor 40 may be an optical sensor, a magnetic sensor, a mechanical switch, or any other suitable position sensor, as illustrated by dashed blocks 42, 44 and 46 in FIG. 3.

Figure 4:
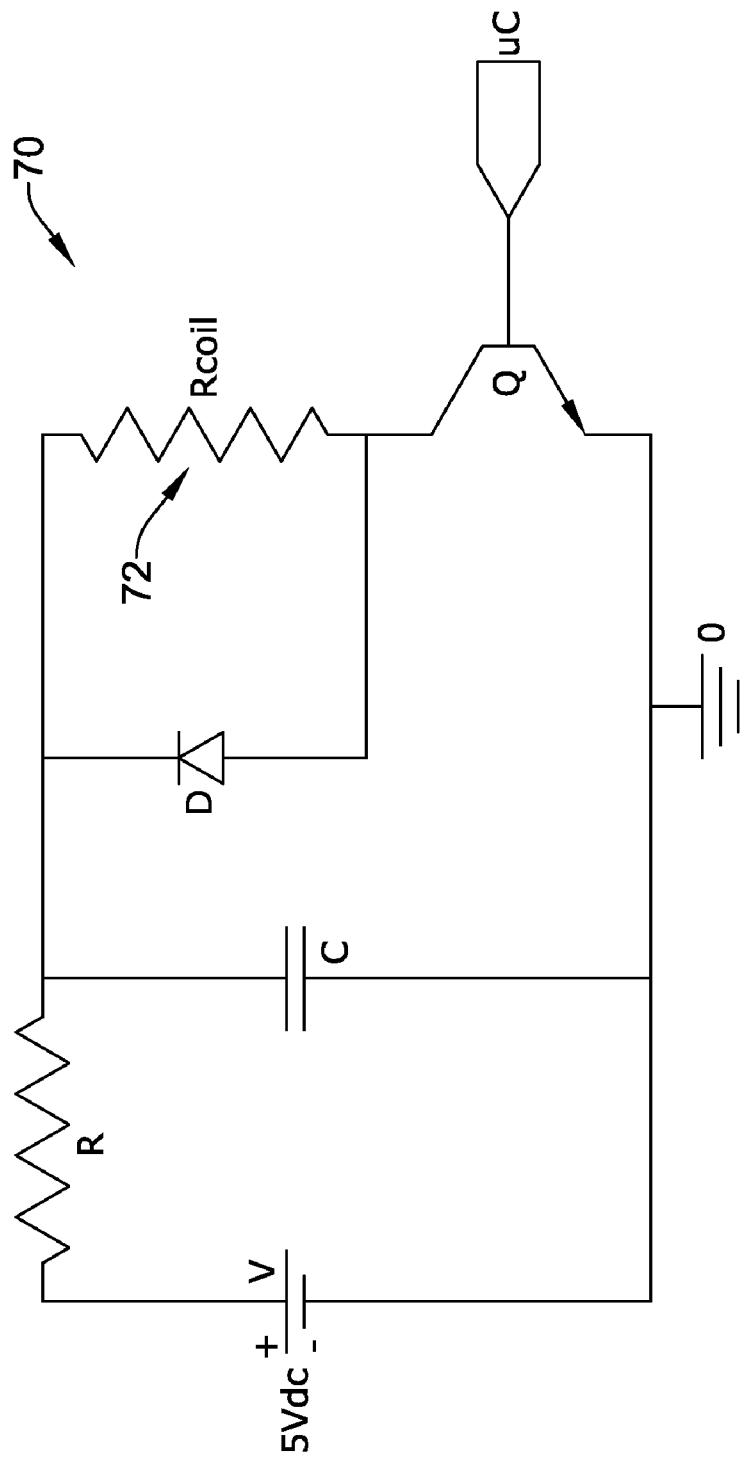
FIG. 4 is a schematic diagram of an illustrative switching circuit in accordance with an illustrative embodiment of the present invention.

FIG. 4 is a schematic diagram of an illustrative switching circuit in accordance with an illustrative embodiment of the present invention. In some cases, the illustrative switching circuit may be incorporated into one or more of the switches 48a-48c of FIGS. 2-3. The illustrative switching circuit is generally shown at 70, and may include an input coupled to a controller to activate the circuit 70 which then moves the position of the switch. The switching circuit 70 includes an Rcoil 72, which in the illustrative embodiment, is a coil of a relay (not explicitly shown).

The relay may be activated and/or deactivated by the switching circuit 70, such as, by providing a current flow through the coil Rcoil 72 of the relay. In some cases, the relay may be a latching relay, electromagnetic relay, or any other suitable relay, as desired. Depending on the type of relay, and in some cases, the relay may have one coil or multiple coils. In the case of a single coil, a current flow through the coil Rcoil 72 may activate the switch to a closed position and the absence of a current flow through the coil Rcoil 72 may open the switch, or visa-versa depending on the relay configuration.

Latching relays often have two coils, one for opening the relay and another for closing the relay. Latching relays are often used when it is not desirable to constantly provide current to the relay to keep the relay open. This may conserve energy. For a latching relay, two or more switching circuits 70 may be desirable, one for each coil of the relay.

In the illustrative embodiment, the switching circuit 70 includes a transistor Q, a voltage source V, a capacitor C, a resistor R, and a diode D. In some cases, the voltage source V may be a 5 volt dc power source. However, any suitable voltage source V may be used, as desired. The resistor R may be provided in series with the voltage source V to help control the current that is provided to the coil Rcoil 72. In one case, the resistance of resistor R may be about 499 ohms and the resistance of Rcoil 72 may be about 100 ohms, but it is contemplated that any suitable resistances may be used, depending on the circumstances.

In some cases, capacitor C may be provided in parallel to the voltage source V. The capacitor C may provide a temporary power source for the switching circuit 70 in order to power the circuit for a limited period of time, such as, in case of a power failure. At start up, the capacitor C may charge so that if the voltage source V is interrupted, the capacitor C can still provide power to the switching circuit 70 for a period of time.

The capacitor C may be desirable in some applications. For example, when the actuated part is a biased actuated part (e.g. biased closed by a spring), and if power is lost to the motor, the actuated part may close upon a power failure. It may be important in some applications (e.g. inter-lock applications) to have that the state of the electrical switches (e.g. relays) coincide with the actual position of the actuated part. Thus, when the electrical switches are latching relays, it may be desirable to switch the position of the relays from, for example, a closed position to an open position upon power failure so that the position of the relay coincides with the biased movement of the actuated part. The capacitor C may provide the necessary power to switch the latching relay(s) one last time upon power failure so that the state of the relay(s) matches the state of the actuated part.

In some cases, the capacitor C may be sized to provide power for 30 seconds or more so that the controller may detect the unpowered biased movement of the actuated part and to adjust the switch accordingly. In some cases, the controller 32 may also have a capacitor (not shown) to provide power to the controller 32 to detect the biased movement of the actuated part and to provide an appropriate control signal to the switching circuit 70 upon a power failure. In some cases, the capacitor C for the relay may also provide power to the controller 32. In one illustrative embodiment, the capacitor C may be 470 microfarads to provide an appropriate amount of power. However, any suitable size capacitor C may be used, as desired.

In the illustrative embodiment, transistor Q may switch the current through the Rcoil 72 of the relay according to a control signal (μC) received from the controller. In the illustrative embodiment, transistor Q may be a bipolar junction transistor (BJT), such as a NPN for the BJT type, but it is contemplated that any suitable device may be used. The transistor Q may have a base terminal connected to the controller, a collector terminal connected to the coil Rcoil 72, and an emitter terminal connected to ground. When the controller provides a control signal (μC) to the base terminal and turns on the transistor Q, a current flows through the Rcoil of the relay, causing the relay to switch positions.

In the illustrative embodiment, the diode D may be provided in parallel to the Rcoil 72 of the relay. The Rcoil 72 will typically have some inductance, which prevents the current in the Rcoil 72 from immediately stopping when the transistor Q is turned off. The diode D may function as a freewheeling diode D, and may provide a current path for the current that is traveling through the Rcoil 72 when the transistor Q is turned off by the controller. This may help protect the transistor Q.

Figure 5A:
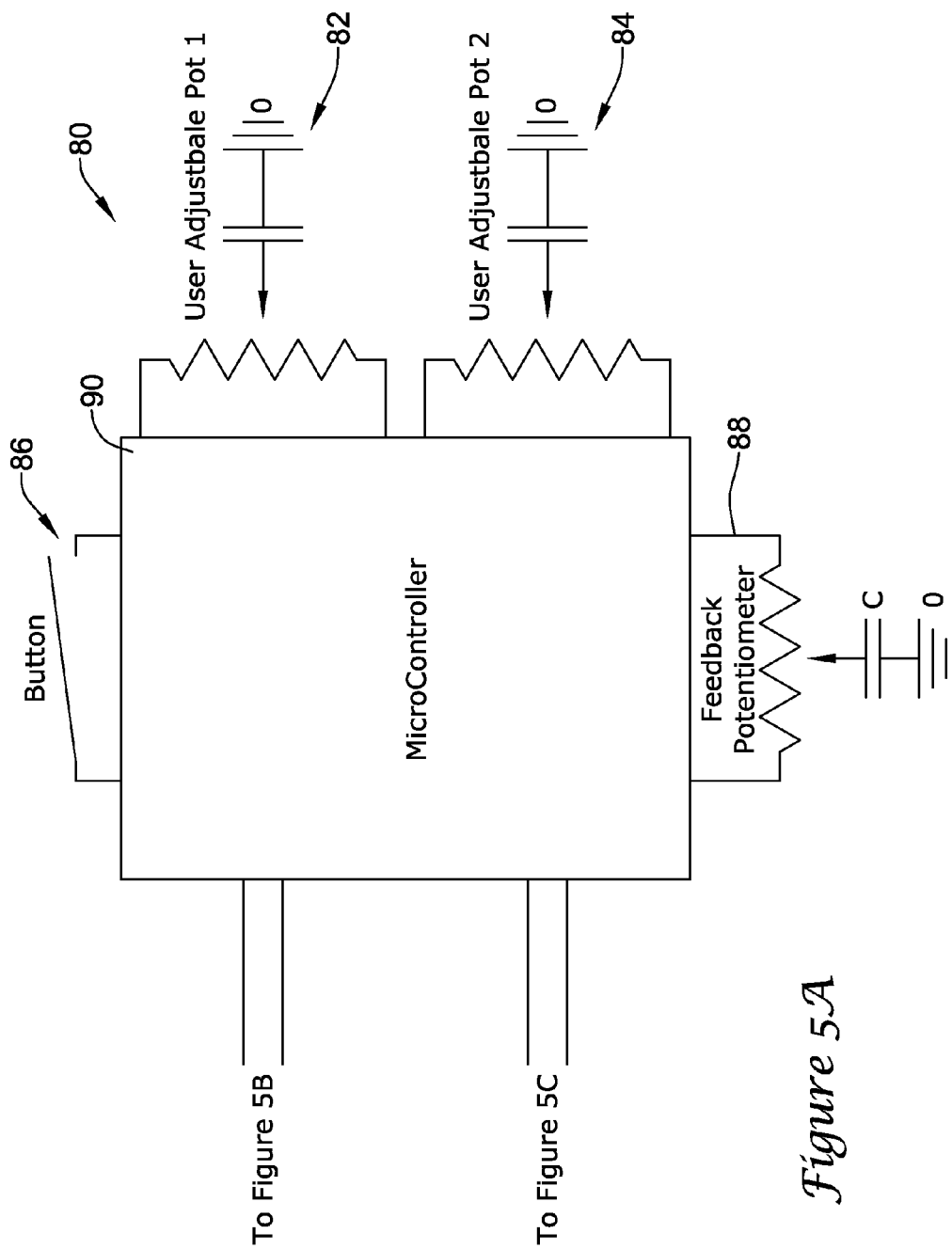
FIGS. 5A-5C show a schematic diagram of a control circuit for an illustrative HVAC actuator.
Figure 5B:
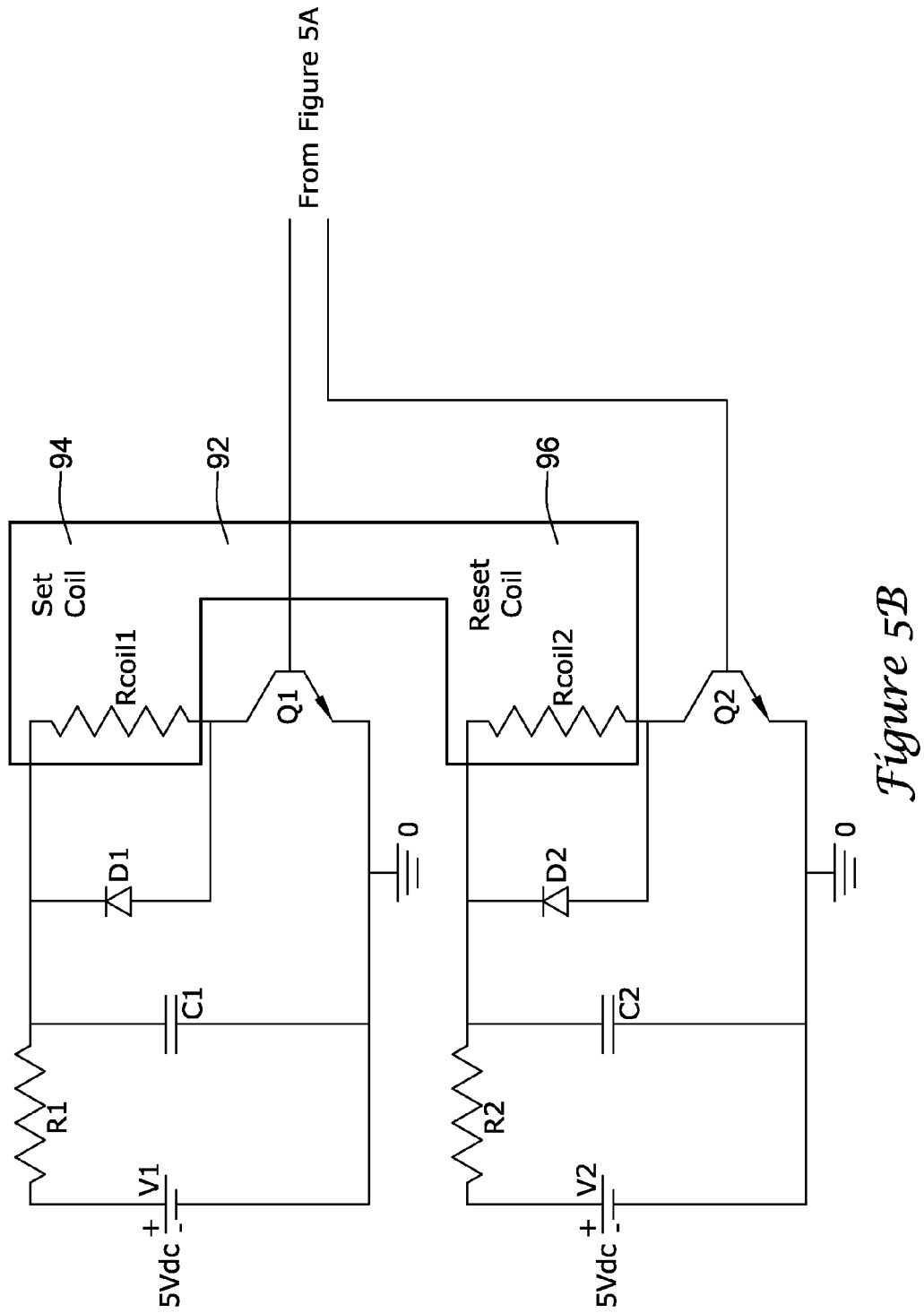
Figure 5C:
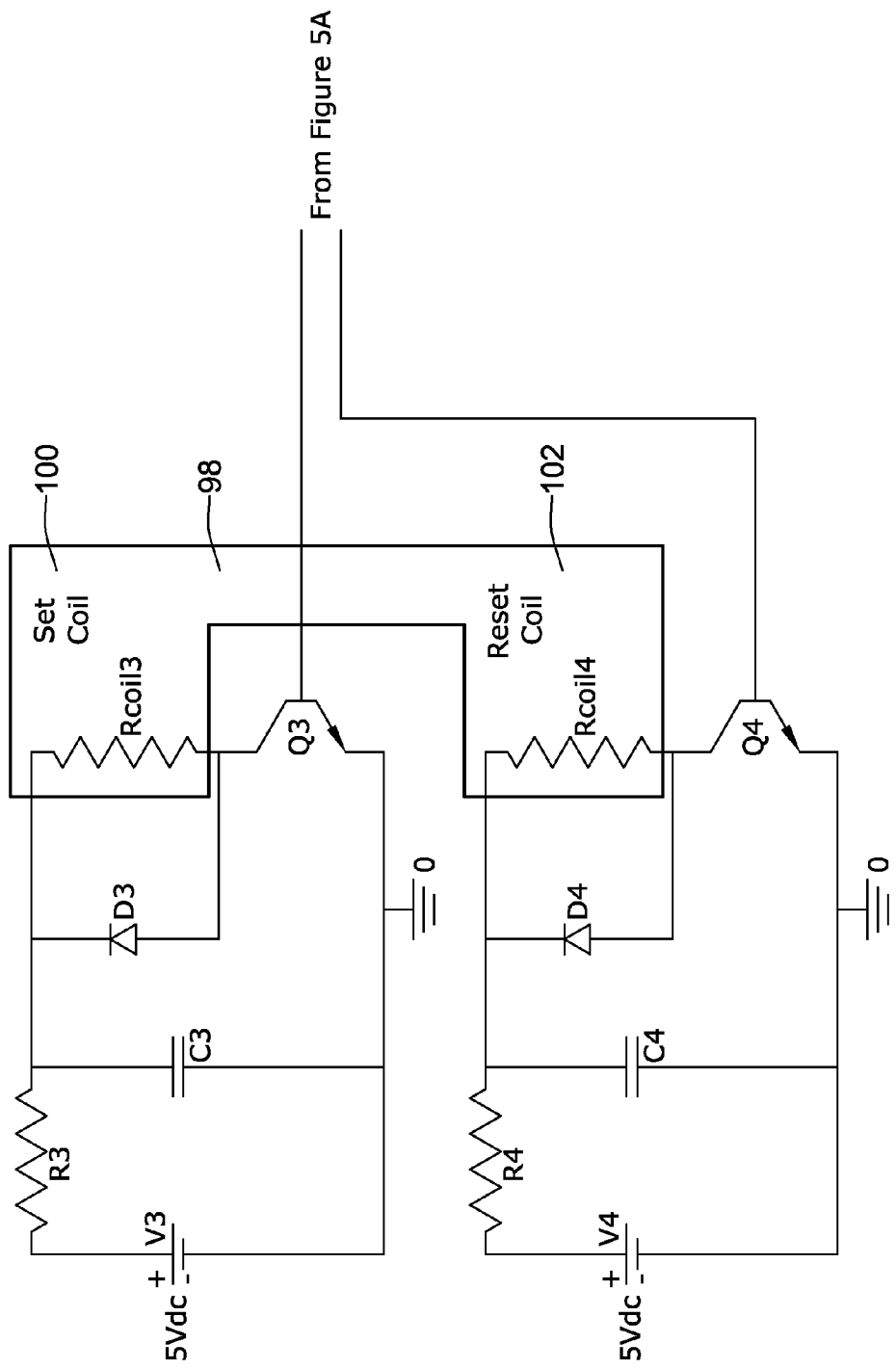

FIGS. 5A-5C show a schematic diagram of a control circuit for an illustrative HVAC actuator. The illustrative control circuit is generally shown at 80, and includes a controller 90 (FIG. 5A) coupled a first switching circuit (FIG. 5B) and a second switching circuit (FIG. 5C). The first switching circuit is adapted to control a first latching relay, and the second switching circuit is adapted to control a second latching relay.

Referring specifically to FIG. 5A, and in the illustrative embodiment, the controller 90 may be coupled to an actuator position sensor such as a feedback potentiometer 88, as well as two user adjustable switch point potentiometers (pots) 82 and 84. In some cases, the controller 90 may be a microcontroller. However, it is contemplated that any suitable controller may be used (e.g. microcontroller, microprocessor, etc.), as desired.

The illustrative controller 90 may include a first input connected to the feedback potentiometer 88 for monitoring the position of an actuated part. The illustrative controller 90 may also include a second input connected to a first user adjustable switch point potentiometer 82, and a third input connected to a second user adjustable switch point potentiometer 84. The first user adjustable switch point potentiometer 82 may be used to manually adjust the switch point of the first switching circuit (FIG. 5B), and the second user adjustable switch point potentiometer 84 may be used to manually adjust the switch point of the second switching circuit (FIG. 5C). Each switch point may correspond to a desired position of the actuated part, as sensed by the feedback potentiometer 88. The illustrative controller 90 may also include a first output coupled to the first switching circuit (FIG. 5B) and a second output coupled to the second switching circuit (FIG. 5C), as shown.

In some cases, the illustrative controller 90 may be programmed to receive a signal corresponding to the position of the actuated part from the feedback potentiometer 88, compare that signal to one or more switch points set by the first user adjustable switch point potentiometer 82 and/or the second user adjustable switch point potentiometer 84, and, if the signal is at or past a desired switch point, send a signal to the first switching circuit (see FIG. 5B), the second switching circuit (see FIG. 5C), or both, to set or reset the corresponding latching relay(s) accordingly.

Instead of using the user adjustable switch point potentiometers 82 and 84 to set the switch points for the first switching circuit (see FIG. 5B) and/or the second switching circuit (see FIG. 5C), or in addition to, it is contemplated that one or more buttons 86 or similar devices may be coupled to the controller 90. When so provided, the controller 90 may be configured so that when the user manually moves the actuated part to a desired switch position, and then pushes the button 86, the controller 90 may sense the position of the actuated part via the feedback potentiometer 88, and store a value that is related to the sensed position in a memory, sometimes a non-volatile memory. This may be repeated any number of times to store multiple switch points for the actuator, as desired.

During operation of the actuator, the controller 90 may receive a signal corresponding to the current position of the actuated part from the feedback potentiometer 88, compare that signal to the one or more stored switch points previously set using the push button 86, and, if the signal is at or past a desired switching point, send a signal to the first switching circuit (see FIG. 5B), the second switching circuit (see FIG. 5C), or both, to set or reset the corresponding latching relay(s) accordingly.

In some cases, the controller 90 may send a signal to one of the switching circuits to switch the corresponding relay every time the controller 90 reads the current position of the actuated part. In other cases, the controller 90 may remember the state that the corresponding relay, and determine if the relay needs to be switched when the controller 90 reads the current position of the actuated part, and only send a signal to the appropriate switching circuit if the position of the corresponding relay needs to be switched.

In some cases, the controller 90 may store two or more switch point for each switching circuit. For example, the controller 90 may store a first switch point that is used when the actuated part is moving in a first direction (e.g. toward an open position), and a second switch point that is used when the actuated part is moving in a second direction (e.g. toward a closed position). This may allow the actuator to provide, for example, a level of hysteresis when switching the relays. It is also contemplated that different delays and/or other switching parameters may be set, sometimes depending on the direction of movement of the actuated part.

In some cases, the switch points and/or delay may be set by adding additional potentiometers and/or buttons so that, for example, there is one potentiometer and/or button for setting when each relay will be switched "on", and one potentiometer and/or button for setting when each relay will be switched "off". In other cases, it is contemplated that the potentiometers and/or buttons may be shared by the different relays, so that one potentiometer and/or button may control when a number of relays will switch "on", and another potentiometer and/or button will control when a number of relays will switch "off". Furthermore, it is contemplated that any combination of potentiometers and/or buttons may be used, as desired. In some cases, the controller 90 may have a user interface, such as a PDA interface or any other suitable user interface, to help program the controller 90 including the various switch points and/or delays, as desired.

FIG. 5B is a schematic diagram of a first illustrative switching circuit for switching a first latching relay 92. In the illustrative embodiment, the latching relay 92 has a set coil 94 and a reset coil 96, wherein each coil has a corresponding switching sub-circuit. The illustrative switching sub-circuits may be similar to that shown and described above with reference to FIG. 4, with the sub-circuits having a transistor (Q1, Q2), a voltage source (V1, V2), a resistor (R1, R2), a capacitor (C1, C2), and a diode (D1, D2).

In the illustrative embodiment, the set coil Rcoil1 may be activated to close the latching relay 92 to, for example, enable another system component or device. The reset coil Rcoil2 may be activated to open the latching relay 92 to, for example, disable the other system component or device. In some cases, the controller 90 (see FIG. 5A) may send a signal to transistor Q1 to energize the set coil Rcoil1 and change the position of the latching relay 92 to a closed position when the actuated part is opened past a designated switch point. Similarly, the controller 90 (see FIG. 5A) may send a signal to transistor Q2 to energize the reset coil Rcoil2 to change the position of the latching relay 92 to an open position when the actuated part is closed past a designated switch point. This is just one example. Thus, the position of the latching relay 92 may be dependent on the position of the actuated part.

In the illustrative embodiment, the latching relay 92 may be able to control the operation of another system component, such as another HVAC component, according to the position of the actuated part. For example, if the actuated part is in an open position (e.g. a damper is in an open position), the latching relay 92 may close and enable the activation of another HVAC (e.g. a fan). However, if the actuated part is in a closed position (e.g. a damper is in a closed position), the latching relay 92 may disable the activation of the other HVAC component (e.g., the fan).

FIG. 5C is a schematic diagram of a second illustrative switching circuit for switching a second latching relay 98. Similar to FIG. 5B, the latching relay 98 has a set coil 100 and a reset coil 102, each coil having a switching sub-circuit. The illustrative second switching circuit is similar to that shown and described above with respect to FIG. 5B.

Figure 6:
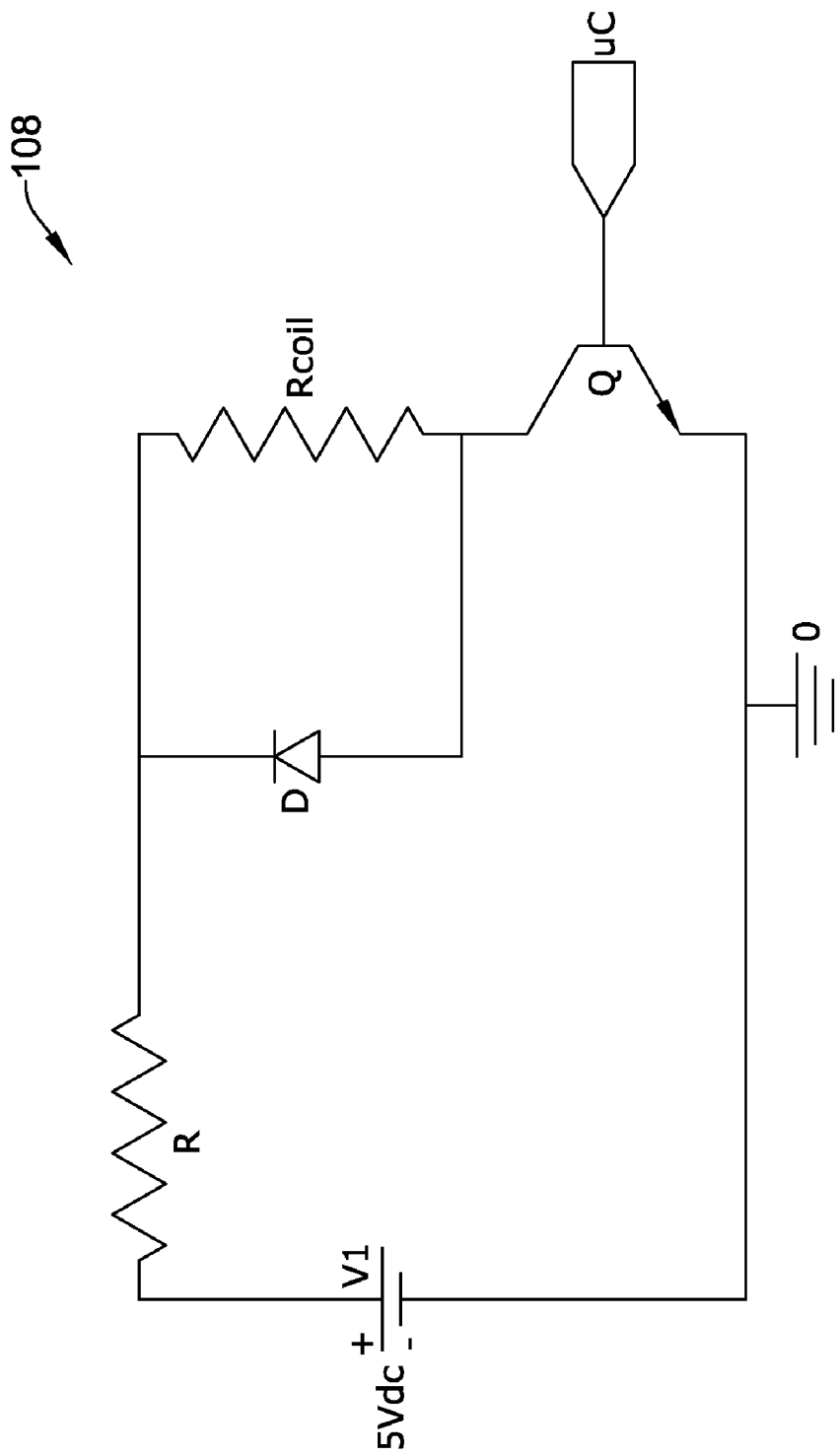
FIG. 6 is a schematic diagram of another illustrative switching circuit in accordance with another illustrative embodiment of the present invention.

FIG. 6 is a schematic diagram of another illustrative switching circuit in accordance with another illustrative embodiment of the present invention. The switching circuit 108 shown in FIG. 6 is similar to the switching circuit 70 shown and described with reference to FIG. 4, except that the switching circuit 108 of FIG. 6 does not include a capacitor. The illustrative switching circuit 108 may have an input coupled to a controller to activate the circuit to move the position of the switch by supplying current though the relay coil, Rcoil.

In this illustrative embodiment, the relay associated with Rcoil may be a non-latching relay that must have current passing through the Rcoil for the relay to remain in the closed position. If current does not flow through the Rcoil, the relay may be biased open. In this case, the relay may be closed by turning on transistor Q, which draws current through Rcoil. Thus, when the controller activates transistor Q of the switching circuit 108, the relay may close, and when the controller deactivates transistor Q, the relay may open. In some cases, this type of switching circuit 108 may be particularly suitable when, for example, an actuated part is biased in a closed position. When a power failure occurs, the actuated part may move to the closed position, and the relay will move to the open position.

Figure 7:
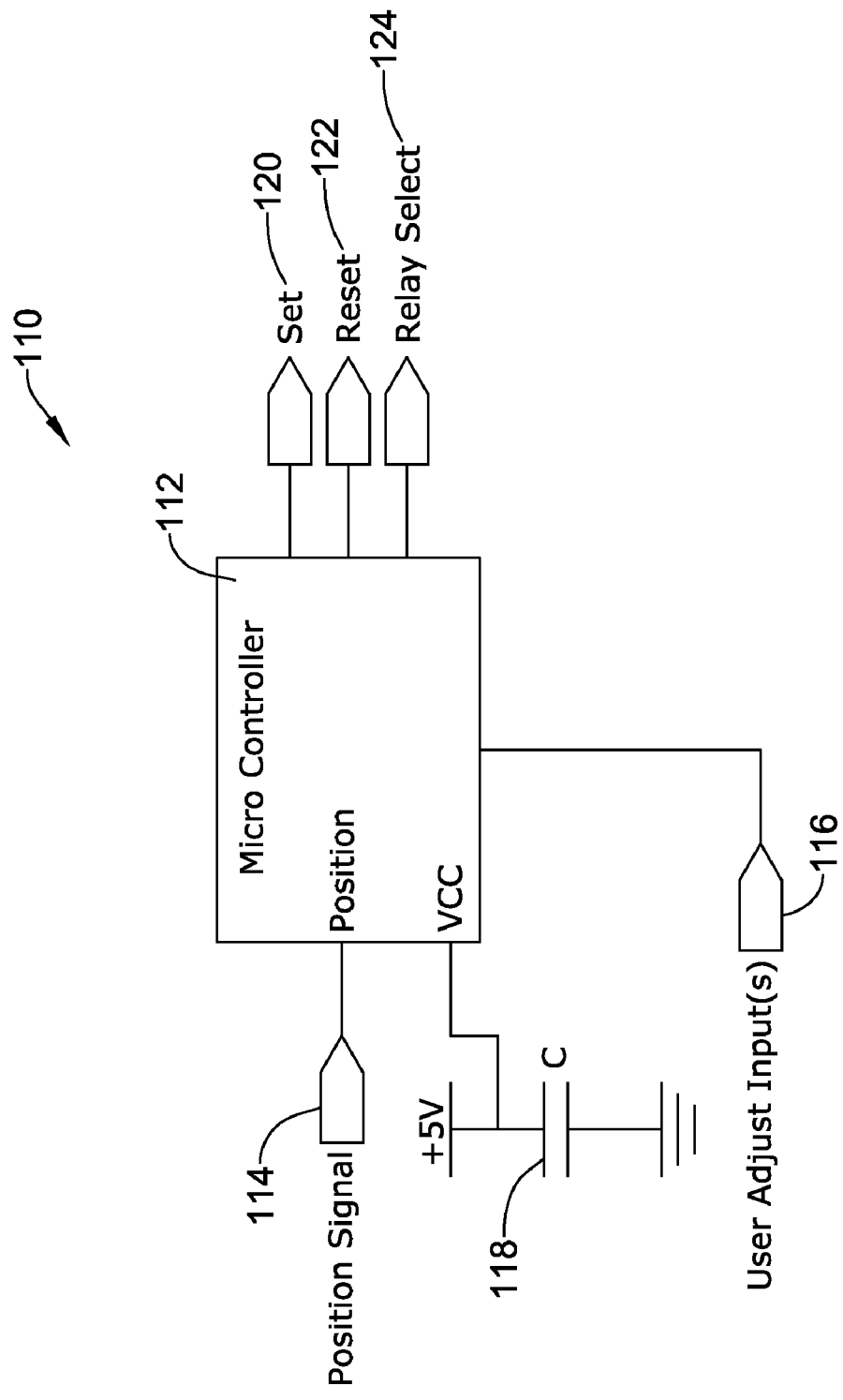
FIG. 7 is a schematic diagram of an illustrative microcontroller configuration for a control circuit in accordance with an illustrative embodiment of the present invention.

FIG. 7 is a schematic diagram of an illustrative microcontroller configuration for a control circuit in accordance with an illustrative embodiment of the present invention. In the illustrative embodiment, a controller 112 has three outputs for controlling two latching relays 126 and 128 (see FIG. 8). The three illustrative outputs of the controller include a SET output 120, a RESET output 122, and a RELAY SELECT output 124. The illustrative embodiment may have an advantage of using fewer I/O pins of the controller 112 to control two latching relays, which may help reduce the cost of the system.

Figure 8:
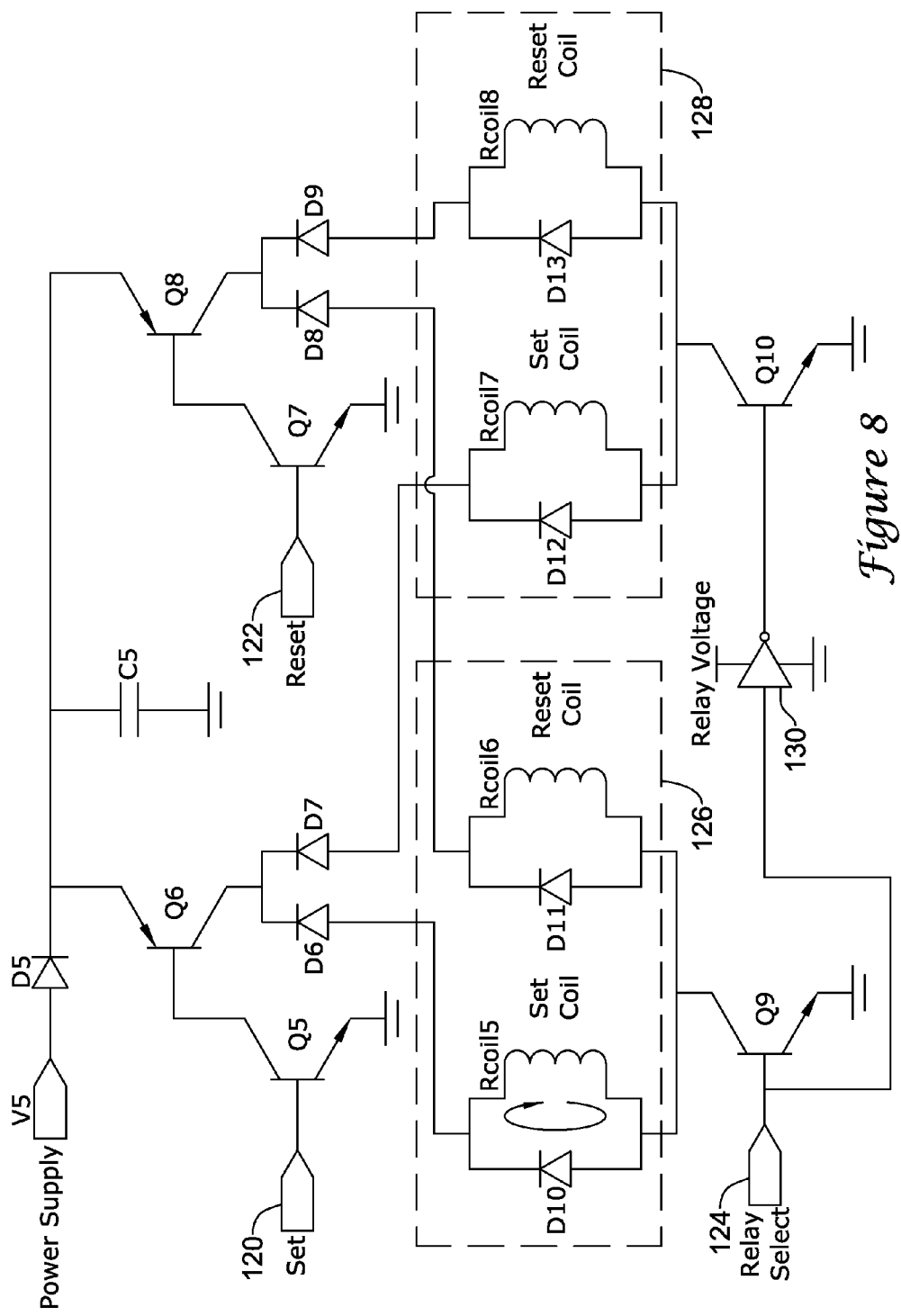
FIG. 8 is a schematic diagram of an electronic switch with relays for use with the illustrative embodiment of FIG. 7.

In the illustrative embodiment, the RELAY SELECT output 124 may allow the controller 112 to selectively activate one of the two relay 126 and 128 of FIG. 8. The controller 112 may be programmed to determine which relay 126 or 128 to selectively activate, according to the position signal 114 and/or the user adjustable inputs 116. The SET output 120 may activate the set coil of the selected relay 126 or 128. The RESET output 122 may activate the reset coil of the selected relay 126 or 128.

In the illustrative embodiment, the controller 112 may have a Vcc input coupled to a voltage source 118 to provide power to the microcontroller 112. In the illustrative embodiment, the voltage source 118 may be a 5 volt dc signal, but this is only an example. A capacitor C is also coupled to the voltage source 118 to provide temporary power to the microcontroller 112 should the voltage source 118 fail. In some cases, the capacitor C may be charged upon start-up and may be configured to provide power upon failure of the voltage source 118 for a period of time, such as for thirty seconds. However, any size capacitor C may be used to provide any amount of temporary power, as desired. In some cases, it is contemplated that a battery or other suitable storage technology may be used in addition to or in place of the capacitor C to provide temporary power to the microcontroller 112, as desired.

FIG. 8 is a schematic diagram of an electronic switch with two latching relays for use with the illustrative embodiment of FIG. 7. In the illustrative embodiment, there are two latching relays 126 and 128 provided, with each relay 126 and 128 having a set coil (Rcoil5, Rcoil7) and a reset coil (Rcoil6, Rcoil8). Each coil may be provided in parallel to a freewheeling diode (D10, D11, D12, D13) to provide a current loop to dissipate the current when the transistors (Q5, Q6, Q7, Q8, Q9, Q10) are switched off, similar to that previously discussed. A power supply V5 may provide power to energize the selected coils Rcoil5, Rcoi6, Rcoil7, Rcoil8. Similar to above, a capacitor C5 may be provided to provide temporary power to the switching circuit in the event of a power failure.

In the illustrative embodiment, the RELAY SELECT input 124 may control which latching relay 126 or 128 is currently selected. The RELAY SELECT input 124 may be provided by the controller 112 of FIG. 7, and may be coupled to the base terminal of a first NPN for the BJT type transistor Q9 of the first switching circuit for the first relay 126, and the base terminal of a second NPN for the BJT type transistor Q10 via an inverter 130 for the second switching circuit for the second relay 128. The controller may then send a high or low signal depending on the relay 126, 128 to be selected. If a high signal is sent, the first relay 126 is selected, and if a low signal is sent, the second relay 128 is selected. In some cases, the RELAY SELECT input 124 is activated with either the SET input 120 or the RESET input 122. Thus, in the illustrative embodiment, the controller 112 is able to control two latching relays 126, 128 while only using three outputs of the controller 112.

In the illustrative embodiment, the SET input 120 is used to set the selected relay 126 or 128 via Rcoil5 and Rcoil7. In the illustrative circuit, the SET input 120 is provided to the base of a BJT transistor Q5. The BJT transistor Q5 may have its collector terminal coupled to the base terminal of BJT transistor Q6, and its emitter terminal connected to ground. The BJT transistor Q6 may be a PNP for the BJT type with its emitter terminal coupled to the power supple V5, its base terminal couple to the collector terminal of the BJT transistor Q5 as previously mentioned, and its collector terminal connected to the set coils Rcoil5 and Rcoil7 via diodes D6 and D7, respectively. Thus, when the controller 112 activates the SET input 120, the two BJTs Q5 and Q6 provide current to the selected set coil Rcoil5 or Rcoil7 to energize the coil and switch the selected relay 126, 128 to the set position.

Similar to the SET input 120, the RESET input 122 is used to reset the selected relay 126 or 128 via Rcoil6 and Rcoil8. In the illustrative circuit, the RESET input 122 is provided to the base of a BJT transistor Q7. The BJT transistor Q7 may have its collector terminal coupled to the base terminal of BJT transistor Q8, and its emitter terminal connected to ground. The BJT transistor Q8 may be a PNP for the BJT type with its emitter terminal coupled to the power supple V5, its base terminal couple to the collector terminal of the BJT transistor Q7 as previously mentioned, and its collector terminal connected to the reset coils Rcoil6 and Rcoil8 via diodes D8 and D9, respectively. Thus, when the controller 112 activates the RESET input 122, the two BJTs Q7 and Q8 provide current to the selected reset coil Rcoil6 or Rcoil8 to energize the coil and switch the selected relay 126, 128 to the reset position.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A control system for controlling a component according to the position of an actuated part of an actuator along a range of motion of the actuated part, comprising:
   a position sensor for sensing a current position of the actuated part of the actuator;
   a switch for selectively passing a control signal to the component to be controlled;
   a controller coupled to the position sensor and the switch, the controller configured to receive a detected position of the actuated part from the position sensor and to provide one or more switch control signals to the switch to selectively switch the position of the switch at one or more particular selected positions along the range of motion of the actuated part.

2. The control system of claim 1 wherein the switch is a relay with a switching circuit coupled to the relay, the switching circuit capable of switching the position of the relay between an open position and a closed position.

3. The control system of claim 2 wherein the relay includes two or more coils including a first coil to open the relay and a second coil to close the relay, wherein the switching circuit is coupled to the first coil of the relay.

4. The control system of claim 3 wherein the switching circuit is further coupled to the second coil of the relay.

5. The control system of claim 2 wherein the controller and the switching circuit can switch the position of the relay in response to a change in the position of the actuated part.

6. The control system of claim 2 wherein the switching circuit includes a capacitor that provides temporary power to the switching circuit during a power source failure.

7. The control system of claim 2 wherein the switching circuit includes a battery that provides temporary power to the switching circuit during a power source failure.

8. The control system of claim 1 further comprising one or more user adjustable inputs coupled to the controller for setting one or more switch points that correspond to the one or more selected positions along a range of motion of the actuated part.

9. The control system of claim 8 wherein the one or more user adjustable inputs include a user adjustable potentiometer.

10. The control system of claim 1 wherein the position sensor is a potentiometer that detects a position of a drive mechanism of the actuator.

11. The control system of claim 1 wherein the switch has an open position and a closed position.

12. The control system of claim 11 wherein the switch enables operation of the component when the switch is in the closed position, and disables operation of the component when the switch is in the open position.

13. A control system for monitoring the position of an actuated part in an actuator, comprising:
   a position sensor for detecting a measure that is related to the position of the actuated part along a range of motion of the actuated part;
   a relay that has an open position and a closed position;
   a switching circuit coupled to the relay, the switching circuit for switching the position of the relay between the open position and the closed position; and a controller coupled to the position sensor and the switching circuit, the controller configured to receive the measure that is related to the position of the actuated part from the position sensor and to selectively activate the switching circuit to switch the relay depending on the measure that is related to the position of the actuated part and one or more defined switch points along the range of motion of the actuated part.

14. The control system of claim 13 wherein the relay includes two or more coils including a first coil to open the relay to the open position and a second coil to close the relay to the closed position, wherein the switching circuit is coupled to the first coil of the relay and to the second coil of the relay.

15. The control system of claim 13 wherein the position sensor is a potentiometer that is coupled to a driving mechanism of the actuated part, wherein the potentiometer adjusts the resistance of the potentiometer according to the position of the actuated part along the range of motion of the actuated part.

16. The control system of claim 13 wherein the relay enables operation of a component when the relay is in the closed position and disables operation of the component when the relay is in the open position.

17. A control system for monitoring the position of an actuator and for controlling the operation of a component, comprising:
  a position sensor for sensing the position of an actuated part of the actuator;
  a latching relay for controlling the operation of the component, the latching relay having at least two coils and two positions including an open position and a closed position;
  a first switching circuit coupled to a first coil of the latching relay that can switch the relay to the open position;
  a second switching circuit coupled to a second coil of the latching relay that can switch the relay to the closed position; and
  a controller coupled to the position sensor, the first switching circuit, and the second switching circuit, the controller configured to receive the sensed position of the actuated part from the position sensor, and to selectively activate the first switching circuit or the second switching circuit to switch the latching relay to the open position or the closed position, respectively, depending on the sensed position of the actuated part;
  wherein when the relay is in the closed position, operation of the component is enabled and when the relay is in the open position, operation of the component is disabled.

18. A method for switching a relay depending on a position of an actuated part of an actuator along a range of motion of the actuated part, the actuator including a motor coupled to a drive mechanism for driving the actuated part along the range of motion, a position sensor for detecting a current position of the actuated part along the range of motion of the actuated part via the drive mechanism, a controller coupled to the position sensor and the relay, the relay having an open position and a closed position, the method comprising:
  detecting the current position of the actuated part along the range of motion of the actuated part via the position sensor;
  providing a switch point for a position of the actuated part along the range of motion of the actuated part at which the relay switches; and
  switching the relay between the open position and the closed position if/when the current position of the actuated part crosses the switch point.

19. The method of claim 18 further comprising:
  wherein the providing step includes providing a first switch point that corresponds to a first position of the actuated part along the range of motion of the actuated part at which the relay is to be switched open, and providing a second switch point that corresponds to a second position of the actuated part along the range of motion of the actuated part at which the relay is to be switched closed;
  switching the relay to an open position if/when the current position of the actuated part moves past the first switch point; and
  switching the relay to a closed position if/when the current position of the actuated part moves past the second switch point.

20. The method of claim 19 further comprising:
  providing a first potentiometer that can be adjusted to set the first switch point; and
  providing a second potentiometer that can be adjusted to set the second switch point.

21. A method of switching a relay controlling the operation of a component according to a position of an actuated part of an actuator along a range of motion of the actuated part, the actuator including a motor coupled to a drive mechanism to drive the actuated part, a position sensor that can detect the current position of the actuated part along the range of motion of the actuated part, a controller coupled to the position sensor and the relay via a switching circuit, the relay having a first position and a second position, the method comprising:
  detecting a current position of the actuated part along the range of motion of the actuated part via the position sensor;
  switching the relay between the first position and the second position based on one or more switch points and the current position of the actuated part along the range of motion of the actuated part;
  enabling operation of the component if the relay is in the first position; and
  disabling operation of the component if the relay is the second position.

22. A control system for controlling a component according to the position of an actuated part of an actuator along a range of motion of the actuated part, comprising:
  a position sensor for sensing a current position of the actuated part of the actuator;
  a switch for selectively passing a control signal to the component to be controlled;
  a controller coupled to the position sensor and the switch, the controller configured to receive a detected position of the actuated part from the position sensor and to provide one or more switch control signals to the switch to selectively switch the position of the switch depending solely on the detected position of the actuated part along the range of motion of the actuated part.

23. The control system of claim 22 wherein the control signal is a component enable signal.

24. The control system of claim 23 wherein the switch provides an inter-lock function for the component to be controlled by preventing the enable signal from being provided to the component unless the position of the actuated part is at a desired position.

25. The control system of claim 24 wherein the component is an HVAC component and the actuator is an HVAC actuator.

* * * * *